July 28, 1925.                                                                1,547,235
                             P. V. POWELL
METHOD OF AND MEANS FOR ELECTRICALLY CONTROLLING THE THROTTLE OR LIKE
     VALVE IN INTERNAL COMBUSTION ENGINES FOR PROPELLING VEHICLES
                       Filed July 20, 1920           2 Sheets-Sheet 1

INVENTOR:
Phillip Victor Powell,
By Niilans Niilans attys

July 28, 1925.
P. V. POWELL
1,547,235
METHOD OF AND MEANS FOR ELECTRICALLY CONTROLLING THE THROTTLE OR LIKE
VALVE IN INTERNAL COMBUSTION ENGINES FOR PROPELLING VEHICLES
Filed July 20, 1920
2 Sheets-Sheet 2
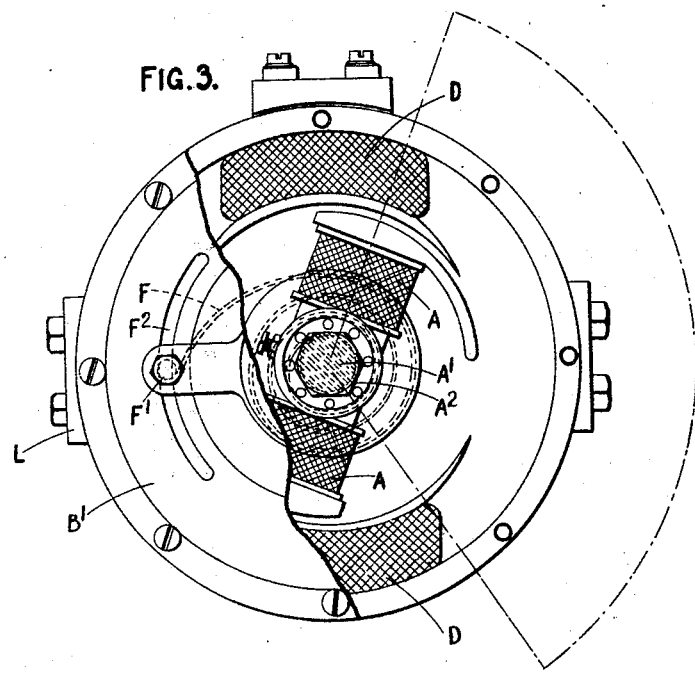
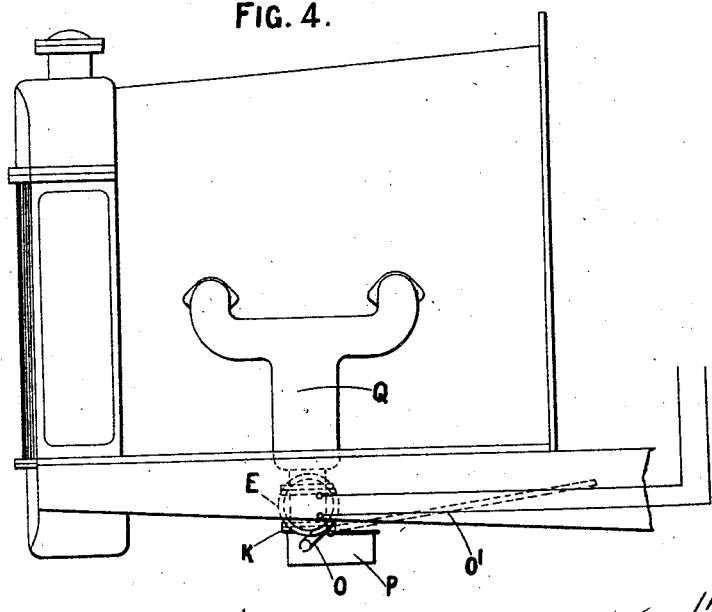
INVENTOR
Phillip Victor Powell,
By Nilaus Nilaus Atty's.

Patented July 28, 1925.

1,547,235

UNITED STATES PATENT OFFICE.

PHILLIP VICTOR POWELL, OF KENT, ENGLAND.

METHOD OF AND MEANS FOR ELECTRICALLY CONTROLLING THE THROTTLE OR LIKE VALVE IN INTERNAL-COMBUSTION ENGINES FOR PROPELLING VEHICLES.

Application filed July 20, 1920. Serial No. 397,770.

*To all whom it may concern:*

Be it known that I, PHILLIP VICTOR POWELL, a subject of the King of Great Britain, and a resident of Kent, England, have invented an improved method of and means for electrically controlling the throttle or like valve in internal-combustion engines for propelling vehicles, of which the following is the specification.

The object of my invention is to provide an improved method of and means for controlling electrically and automatically the operation of the throttle or like regulating valve in internal combustion engines used for propelling vehicles, and particularly in vehicles of that type having an electric transmission and known as petrol electric vehicles.

My method and apparatus comprises an electro-responsive device coupled directly to the spindle or the like upon which the throttle or like valve is mounted, and the electro-responsive device is placed adjacent the inlet pipe of the engine.

I provide an armature mounted upon a spindle in suitable bearings which may conveniently be antifriction bearings and the said armature is adapted to oscillate in a magnetic field. The oscillating armature moves electrically against the action of a spring, which spring serves to bring the armature back to its normal position of rest, which position is also the open position of the valve. The armature is clutched or directly coupled to the spindle of the valve.

The armature is connected in the transmission circuit and in series with the magnetic field coils and the arrangement is such that the movement of the armature is in accordance with the variation in voltage of the generator or dynamo which provides the transmission energy for the vehicle.

My invention is particularly applicable for governing the engine automatically and thereby automatically controlling the current when the vehicle plant is employed for arc welding or search light projector purposes when the vehicle is stationary. When it is desired to employ the vehicle plant again for transmission the throttle governor may be disconnected or unswitched if desired and placed in the fully open or vertical position.

And in order that my invention may be completely understood reference should be made to the accompanying sheet of drawings which illustrates the preferred mode of carrying my invention into effect.

Fig. 3 is an end view of the oscillating electro-responsive device with part of the end cover broken away.

Fig. 4 is a diagram showing the device fitted between the carburetter and the induction manifold.

Figure 1:
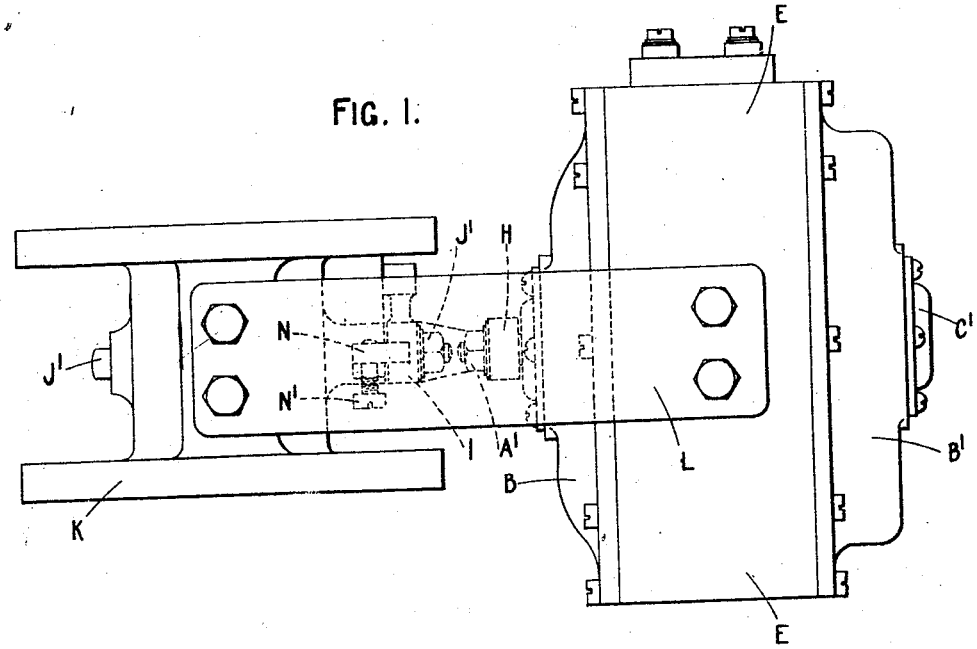
Fig. 1 is an elevation of the detachable throttle valve casing member with the electrical control secured thereto.
Figure 2:
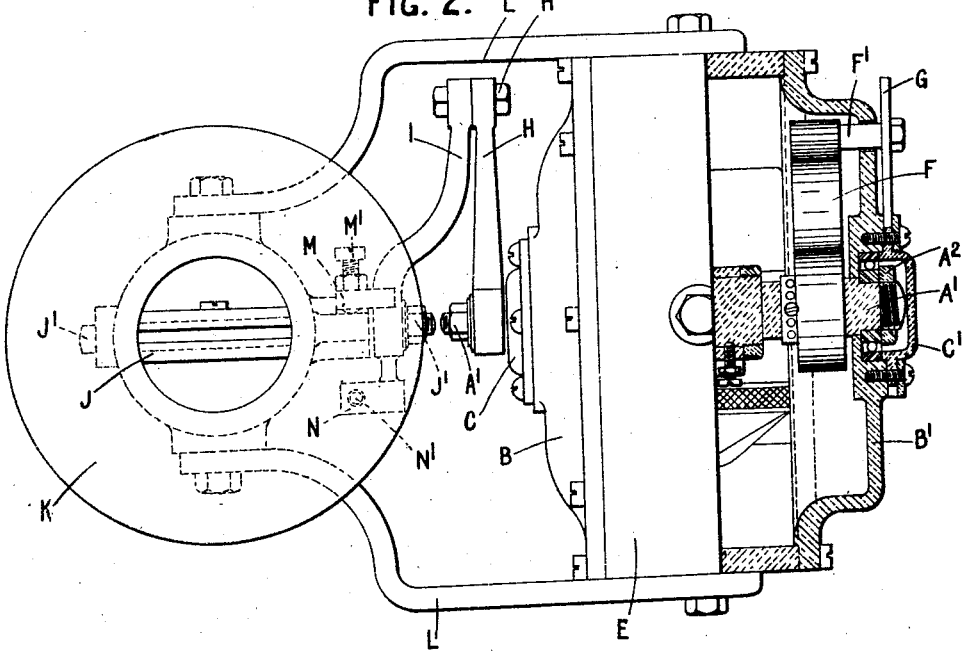
Fig. 2 is a plan view, part section of Fig. 1.

The armature A, as shown in the end view, Fig. 3, is secured on a shaft or spindle $A^1$, which spindle is mounted in suitable bearings of which one, $A^2$, is shown in Figs. 2 and 3. These antifriction bearings are held within central recesses formed in the end casings B, $B^1$, of the apparatus, each bearing having a closing cap C, $C^1$. The armature A is adapted to oscillate or have a semi-rotary movement in the magnetic field produced by the windings D which are secured upon the inner surface of the casing or housing E of the apparatus. The casing E is cylindrical and the windings D are oppositely placed within the casing E. The armature A will oscillate in the magnetic field directly the voltage rises it being connected in series across the outer terminals of the generator or dynamo which is arranged as usually employed coupled direct with the internal combustion engine upon motor vehicles for petrol electric transmission. The armature A therefore moves electrically in one direction and in the other direction by means of the spring F which is coiled round the shaft or spindle $A^1$ and the inner end of the coiled spring is secured thereto. The outer end of the spring is held by the bolt or pin $F^1$. Means for varying the tension of the spring and thereby its resistance to the electrical movement of the armature are provided by means of the lever arm G which is integrally formed with or secured to the closing cap $C^1$ before referred to. The pin or stud $F^1$ to which the outer end of the spring F is secured projects through the slot $F^2$ formed in the end cover $B^1$ of the apparatus, see Fig. 3. Thus movement by hand or otherwise of the lever arm G in one direction serves to increase the tension of the spring and the resistance to the movement of the armature, and movement in the other direction in the said slot decreases this tension. The other end of the spindle $A^1$ projects through the cap C and has mounted thereon the arm or lever H; the outer end of the arm H is secured by the bolt $H^1$ to the arm or lever I which is mounted upon the spindle $J^1$ of the throttle valve J. In order to make the whole apparatus compact and attachable or detachable as a unit the valve J is mounted in a separate flanged housing or passage-way K which is secured by the brackets L to the cylindrical casing or housing E of the electro-responsive device. By means of the lever arms H and I, the spindle $A^1$ of the oscillating armature of the electro-responsive device is connected to the spindle $J^1$ of the throttle valve. As shown in Fig. 2 the stop M which is preferably formed integrally with the lever arm I is provided with an adjustable set screw $M^1$ in order to limit the movement of the electro-responsive device and the valve J in one direction, and a similar stop N is provided to limit the movement in the other direction, the stop N having fitted therein the adjustable screw $N^1$. The valve H is thus kept in a vertical or maximum open position when inoperative, so that the petrol electric transmission plant may be run if and when desired with the electro-responsive device cut out and isolated, the internal combustion engine being then controlled by the ordinary throttle valve fitted below it as shown in Fig. 4. This valve has the lever arm O and the link $O^1$ of the usual kind for control. P is the usual carburetter and Q the induction pipe manifold.

By means of this automatic electric throttle control or governor the voltage is maintained or approximately maintained at the terminals of the electric generator as before stated at a predetermined constant value, the generator being coupled direct as before stated to the internal combustion engine.

When the electric welding set for example is connected up for operation by means of this device the usual manually or pedally operated throttle valve O is opened to speed up the engine, the voltage of the generator or dynamo will correspondingly increase and the electro-responsive device being energized, the armature A will oscillate upon its spindle giving a rotative movement against the action of the spring F and so partly closing the throttle valve J. This movement is therefore in proportion to the voltage generated and the speed of the engine may be controlled or determined by the adjustment of the lever of the ordinary throttle. When the magnetic field ceases to operate the spring returns the armature to the position shown in Fig. 3 and the valve to the fully open position shown in Fig. 2.

It will be obvious that the details of construction and arrangement of the rotative or oscillating armature and the other members of the electro-responsive device may be considerably modified in detail and constructional arrangement without departing from the method or the scope of this invention.

What I do claim as my invention and desire to secure by Letters Patent is:—

1. An electric governing device for a throttle valve comprising a casing having a slot therein, a magnetic field in the casing, an armature rotatably mounted and adapted to oscillate in the magnetic field, means connecting the armature spindle and throttle valve, a lever, a pin carried by the lever and extending through the slot into the casing, and a spring having one end connected to the pin and the opposite end connected to the armature spindle.

2. An electric governing device for a throttle valve comprising a casing having a slot therein, an armature pivotally mounted and adapted to oscillate in the magnetic field, means connecting the armature spindle and throttle valve, a lever, a pin carried by the lever and extending through the slot into the casing, a spring having one end connected to the pin and the opposite end connected to the armature spindle, and means for limiting the movement of the throttle valve in either direction.

3. An electric governing device for a throttle valve comprising a casing having a slot therein, a magnetic field in the casing, an armature rotatably mounted and adapted to oscillated in the magnetic field, means connecting the armature spindle and throttle valve, a lever, a pin carried by the lever and extending through the slot into the casing, a spring having one end connected to the pin and the opposite end connected to the armature spindle, and adjustable means for limiting the movement of the throttle valve in either direction.

PHILLIP VICTOR POWELL.